United States Patent [19]
Anderson

[11] 3,865,711
[45] Feb. 11, 1975

[54] APPARATUS FOR REMOVAL OF DISSOLVED OR SUSPENDED SOLIDS IN WASTE WATER

[75] Inventor: Harry T. Anderson, Clarendon Hills, Ill.

[73] Assignee: Swift & Company, Chicago, Ill.

[22] Filed: Nov. 23, 1973

[21] Appl. No.: 418,429

Related U.S. Application Data

[62] Division of Ser. No. 191,008, Oct. 20, 1971, Pat. No. 3,816,274.

[52] U.S. Cl.................... 204/275, 204/302, 210/221
[51] Int. Cl............................. B03c 5/02, B01k 3/00
[58] Field of Search........................... 204/186–191, 204/302–308, 149–152, 275, 284, 292, 294; 210/44, 221, 13

[56] References Cited
UNITED STATES PATENTS

| | | | |
|---|---|---|---|
| 1,746,964 | 2/1930 | Polatsik | 204/149 |
| 1,956,411 | 4/1934 | Bonnie | 204/149 |
| 3,543,936 | 12/1970 | Abson | 210/221 |

*Primary Examiner*—T. M. Tufariello
*Attorney, Agent, or Firm*—Edward T. McCabe; Charles E. Bouton; Jay C. Langston, Jr.

[57] ABSTRACT

Waste water containing oil and water emulsions and dissolved or suspended solids is de-emulsified and clarified by creating a three dimensional anolyte stream resulting from the careful placement of anodes and impressing direct or galvanic current through the water. Waste water is first contacted with an anode system in a restricted zone so as to give substantially all of the waste water a rapid pH change of several units and is then conveyed to a second zone wherein a three dimensional anolyte stream is formed causing the oily particles to float to the surface of the water where they can be skimmed off.

5 Claims, 2 Drawing Figures

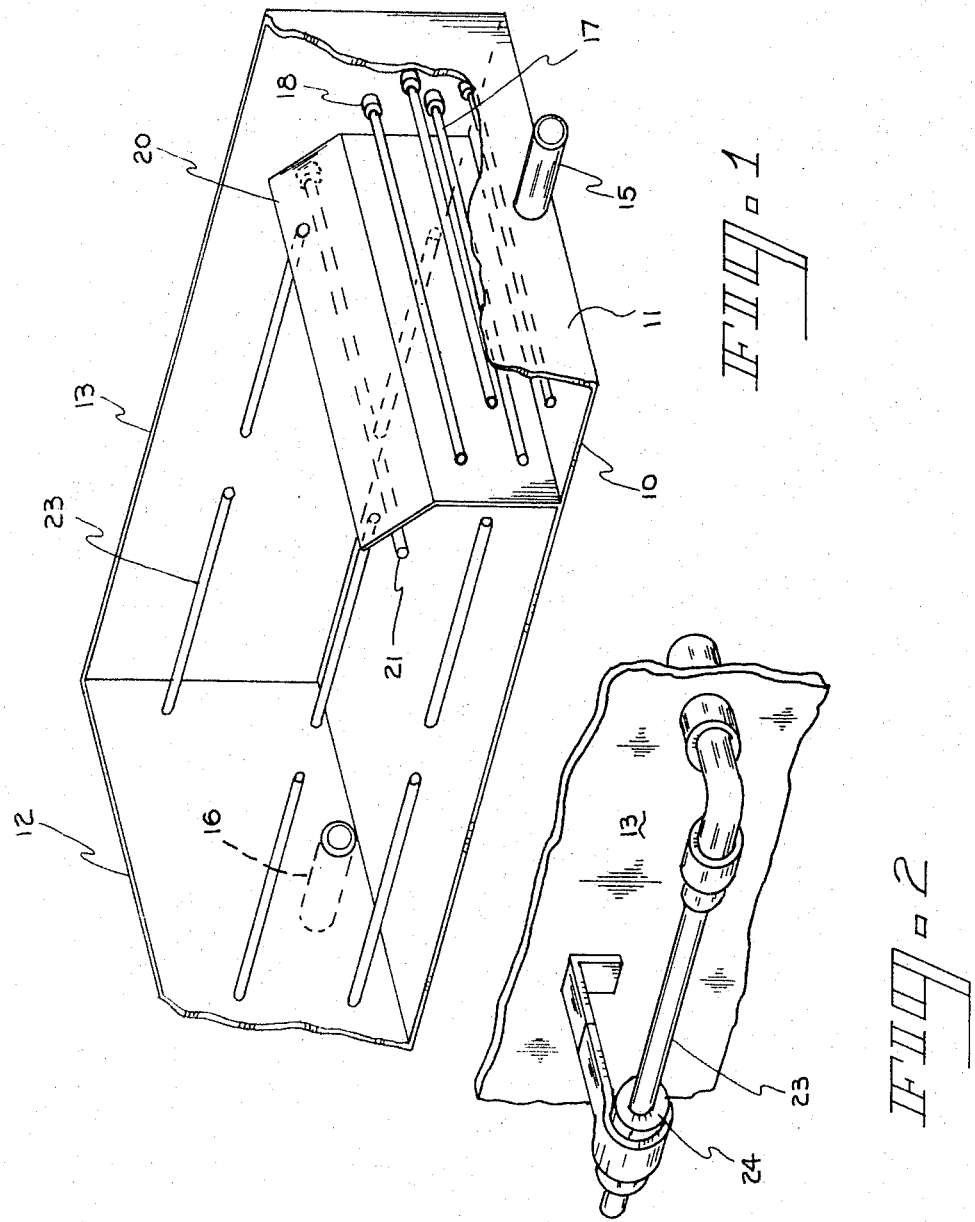

APPARATUS FOR REMOVAL OF DISSOLVED OR SUSPENDED SOLIDS IN WASTE WATER

This is a division of application Ser. No. 191,008, now U.S. Pat. No. 3,876,274, filed 10/20/71.

This invention is concerned with apparatus and method for treatment of waste waters and other effluents containing emulsified amounts of oils, fats, greases and other oily materials which may or may not contain proteins and other polar substances. The process is especially useful in connection with edible oil operations or with packinghouse operations, but can also be used to advantage in the treatment of effluents containing mineral oil from industrial plants. Further, there are a large number of industrial processes which require the use of emulsifiers for one reason or another and the resulting effluent from these processes obviously contain oil and water emulsions which can be broken by the procedures of this invention. Accordingly, the process of this invention is applicable to the economic recovery of certain valuable oils from emulsified systems as well as the mere removal of spent oil or greases from the effluent so as to prevent, to a substantial degree, the pollution of streams, rivers, lakes and seas.

Generally speaking, free fat and oil, i.e., not emulsified fat and oil, present no serious problems in regard to separation from water as they will generally float to the surface and can be skimmed off. Emulsified fats, on the other hand, stay in solution causing severe pollution problems. In this connection, it has been the usual practice in the past to run the waste water from a packinghouse to a settling tank or basin having baffles wherein the water could set for a half hour or so and the free fat would rise to the top and be skimmed off. The emulsified fat would, of course, remain in the water and would accompany it to the sewers. Various means such as aeration and complex apparatus have been employed in attempts to deemulsify the waste waters. Usually, however, unless the emulsified oil was very valuable, no effort was made to separate it from the water that was eventually passed to the sewers and hence to the streams and rivers.

In processes where water is reused, the oil can be removed from the system by coagulation with aluminum sulfate and alkali, followed by filtration through a nonsiliceous filter medium. The oil is caught in the floc and is filtered out of the system. Periodical backwashings of the filter with hot caustic soda are required. It should be noted that the processes used to completely remove the oil from the water are clearly uneconomical for use in cleaning up waste water from packinghouse and edible oil operations. Yet on the other hand, it is desirable to remove these low grade oils from sewage as they may be used in industrial cutting oils, etc. Further, it is now necessary to clean up the water prior to its discharge into streams, rivers and seas.

In this connection, several patented systems are known to those skilled in the art. Included are U.S. Pat. Nos. 1,095,893 and 1,222,637 issued to Landreth; U.S. Pat. No. 1,746,964 issued to Polatsik; U.S. Pat. No. 3,035,992 issued to Hougen and U.S. Pat. No. 3,543,936 issued to Abson, et al. Generally, these Patents disclose systems wherein the cathodes and anodes are alternately spaced or teach the use of a current with sufficiently high anode voltage that vigorous formation of gas bubbles takes place on both anodes and cathodes and these bubbles rise and tend to carry some of the greasy and fatty substances to the surface.

Until recently, however, the geometry of electrode configuration was not considered to be of much importance. Yet on the other hand, applicant's co-pending application Ser. No. 26,769, filed Apr. 8, 1970, now U.S. Pat. No. 3,673,065 discusses and claims a process for the treatment of emulsified fat — water systems wherein the anode configuration is deemed important. In general, the invention of Ser. No. 26,769 is concerned with the treatment of emulsified fat — water systems and comprises impressing direct electrical current in such a manner that a carefully defined, relatively deep, two dimensional, anolyte stream is formed near the bottom of a receptacle at the entry end and progresses upwardly to the water surface at the opposite end or exit end of the receptacle. The system comprises multiple, submerged anodes, usually approximately equal distance apart, parallel to the longitudinal walls of a tank or other receptacle and inclined upwardly. In establishing the electrical circuit, anodes are placed in contact with the waste water and the walls of the receptacle are used as the cathode with the current flowing through the liquid from the anode to the cathode.

The invention of Ser. No. 26,769, while a very definite advance in the treatment of effluent using impressed current, does possess limitations in that the planar design of the system produces a stratification of the influence of the anodes, allowing a cationic effect to take place which can cause re-emulsification of broken emulsions thereby reducing the efficiency of the removal of the suspended solids. In addition, the planar design of that system allows a decrease in potential in strata as the distance from the surface to the anode or anolyte stream increases resulting in diminished reaction rates in regions more distant from the anode. As a consequence, increased current is required to maintain an effective potential for repelling polar materials. A decrease in potential in regions distant from the anode is particularly significant when low cathode potential exists, i.e., when the cathode is corroded. Further, the planar design of the anode system causes poor distribution of the anolyte stream and as a consequence there is a need for additional pH adjustment of the system to separate the re-emulsified particles.

Accordingly, it is one object of this invention to provide an improved means for treating effluent containing fats, oils, greasy materials, proteins and other polar materials.

Another object of this invention is to provide an improved method for the effective removal of solids from waste water.

It is another object of this invention to provide an improved method for breaking a fat — water system containing emulsifiers.

Still another object is to provide a process for the recovery of valuable oil and/or emulsifier from emulsified aqueous systems without using the typical costly systems.

Additional objects, if not specifically set forth herein, will be readily apparent to those skilled in the art from a reading of the detailed description of the invention which follows.

The invention comprises, in general, the treatment of effluent having oil — water emulsion and comprises impressing direct electrical current through the effluent in two or more zones so as to create a three dimensional anolyte stream whereby the emulsion breaks allowing the fat to float to the surface where it is separated from the clarified effluent. The process of this invention concerns the separation of greasy matter from aqueous liquid found in water — oil systems by forming a surface layer of greasy material which can be removed. The process comprises the steps of conveying waste water containing fat — water emulsion to a first zone of a substantially rectangular container possessing a plurality of essentially equally spaced apart anodes so as to give the emulsion a rapid pH change, conveying the solution to a second zone having rows of horizontal, parallel, essentially equally spaced apart anodes so as to form a three-dimensional anolyte stream whereby the fat particles separate cleanly from the water, float to the surface and are subsequently separated from the waste water.

In order to carry out the process of this invention, an apparatus for treating water — oil emulsions has been devised. Such an apparatus comprises a substantially rectangular — inshape container having an entry conduit and an exit conduit and having a first anolyte stream zone at the entry end and a second anolyte stream zone at the discharge end of the container. In the first anolyte zone are rows of a plurality of spaced apart anodes transverse the longitudinal axis of the container while the second anolyte zone has rows of a plurality of anodes spaced apart and substantially parallel to the longitudinal axis of the container, said longitudinal anodes positioned so as to be immersed in effluent and cause a three-dimensional anolyte stream.

In a preferred embodiment of the invention, the container is a tank possessing a baffle across the width of the tank nearer the inlet end than the discharge end and rising somewhat less than the total height of the tank thereby dividing said tank into a first anolyte stream zone and a second anolyte stream zone. Normally the baffle comprises a lower section which is usually substantially parallel to the inlet end of the tank and an upper section being inclined toward the discharge end of said tank. Since the baffle is nearer the inlet end, the series of transverse anodes are positioned in a confined zone and substantially parallel to the end wall. The waste water is allowed to contact the transverse anodes in a confined space where a low pH area is provided by the anodes causing the fat particles to break and rise. The flow of water is upward and over the inclined baffle to a less restricted, discharge zone containing a series of rod shaped anodes positioned in approximately the same direction as the flow of water. The flow of water is such that the anodes in the discharge zone cut through a given body of the emulsion in a substantially uniform manner. In order to prevent floc formation on the underside of the inclined, upper section of the baffle, it was found that at least one rod shaped anode in the discharge zone should be spaced transversely to the longitudinal axis and relatively close to the said underside of the baffle.

A complete understanding of the invention will be attained by reference to the following description and drawing which is a cut-away view of one form of an apparatus for treating water — oil effluent in accordance with the teachings of this invention.

FIG. 1 is a perspective view of the apparatus which may be employed in the practice of the invention.

FIG. 2 is a perspective view of a section of the longitudinal wall of the apparatus.

Referring now to the drawing, one embodiment of the invention comprises a tank 10 having inlet wall 11 and a discharge end wall 12 and longitudinal walls 13. At one end is an inlet conduit 15 attached to inlet end wall 11 while a discharge conduit 16 communicates with the opposite discharge, end wall 12. A plurality of horizontal, rod shaped, substantially parallel, substantially evenly spaced anodes 17 are mounted to the tank 10 in a transverse position. The transverse anodes 17 are usually mounted in spaced insulated support members 18. Dividing tank 10 into two zones (usually unequal in length) is baffle 19 positioned nearer the inlet wall than the discharge wall and extending the width of the tank. The upper section 20 of baffle 19 is inclined toward the discharge end wall 12 to permit the flow of effluent toward the second zone or discharge zone of tank 10. In the apparatus, it is preferred to place at least one transverse anode 21 in the discharge zone relatively parallel and close to the upper section 20 of baffle 19. A plurality of rows of horizontally, substantially parallel, substantially evenly spaced, rod shaped longitudinal anodes 23 are positioned in the discharge zone in approximately the same direction as the flow of effluent and cut through the effluent in a three-dimensional uniform manner whereby a three-dimensional anolyte stream is formed. The longitudinal anodes 23 are suspended above the floor of the tank by electrically insulated support members 24 in the walls 13.

In operation of the apparatus, an effluent containing a water — oil emulsion is conveyed by a pump or other means continuously into tank 10 through inlet conduit 15. A plurality of rod shaped transverse anodes 17 starting just below the intake opening of the tank are spaced relatively close together. It has been determined that the area around the anode will drop about 2 to 4 pH units while the area near the cathode will increase in pH units accordingly. As the effluent flows between the transverse anodes 17, it is subjected to an immediate pH drop of at least 2 units causing the emulsion to break and allow the fat particles to begin to rise to the water surface. Effluent is allowed to flow over upper section 20 of baffle 19 where it comes in contact with a plurality of longitudinally spaced anodes 23 which are spaced substantially equal distance apart from the floor of the tank to near the water surface. All anodes are far enough below the water surface so that they do not interfere with the movement of skim bars. In the discharge zone, a three-dimensional anolyte stream is formed causing the fat and other solid particles to rise to the surface where they are separated from the effluent by separation means, e.g., skim bars (not shown) while the clarified effluent flows out discharge conduit 16.

As stated above, the invention concerns impressing direct electrical current through the effluent in such a manner that a three-dimensional anolyte stream is formed in each zone. In establishing the electrical circuit, the anodes are placed in contact with the waste water. The walls of the receptacle function as the cathode with the current flowing through the liquid from the anode to the cathode. While the walls of the receptacle will function as the cathode, other equivalent embodiments can be used. Rods or sheets of metal can be placed sufficiently close to the walls of the receptacle to act as cathodes. However, cathodes should not be spaced alternately between the anodes as this would disrupt the three-dimensional anolyte streams. Placement of metal sheets close to the walls of the tank is advantageous when the walls of the receptacle are poor conductors of electrical energy, i.e., when they are highly corroded, etc.

In designing the electrical circuit, careful consideration of electrodes is important. The anodes can be of any of the typical metals used in modern-day anode construction as long as they are compatible with the environment in which they are used. It is preferred in most embodiments, however, to use a highly siliconed iron anode inasmuch as this material is relatively inexpensive and has a very low attrition rate. For purposes of this invention, however, any material capable of carrying a current having a low attrition rate can serve as the anode. Additional factors that should be considered when designing the electrical circuit include the electrode profile, surface conditions of the anode, resistance value of the electrode material, electrode potentials, surface distance between electrodes, number of electrodes and the geometry of the electrode placement configuration. These figures and conditions will be explained as a reading of the specification continues. In operation of the process and apparatus of this invention, the electrical current can either be galvanic or impressed direct current. All anodes are usually connected in parallel and an anode potential ranging between about 1 volt and 200 volts preferably between about 1.1 to 20 volts is utilized. The actual potential utilized will depend upon the cations, resistance value and chloride content of the water. For example, if the chloride content is relatively high, it is desirable to use a low potential so that free chlorine does not reach objectionable levels. It is also desirable to conduct the process so that the anode does not operate at a potential that will produce unreasonable polarization of the cathode which would in turn result in stress corrosion. It has been found that the potential at any point between any adjacent anodes should be at least greater than the overall potential at the cathode. In most acceptable systems, the potential at the cathode is greater than about 0.6 volts, hence the lowest potential at a point between any adjacent, parallel anodes should be greater than about 0.6 volts but should not substantially exceed 3 volts.

Generally speaking, steel tank walls (which act as the cathode) possess a potential of about 0.7 volts. It has been found that, when a copper-copper sulfate half cell at the tank wall has a value of about 0.85 volts or higher, good separation between the fat and water is possible. This is particularly true in the case of steel structures. Readings at galvanized structure surfaces should read about 1 to 1.2 volts but may range up to about 1.5 volts.

With the impressed current in operation, generally low pH values are obtained near the anodes. Due to the plurality and spacing of the anodes, a three-dimensional anolyte stream (i.e., a three-dimensional body of liquid in the immediate neighborhood of the anodes during electrolysis) is produced. In the immediate neighborhood of the anodes, a pH value in the order of 1 to 3 is not uncommon while a higher pH value ranging between about 8 to 12 may be found near the walls of the tank.

It has been found that the system will operate on acidic, substantially neutral or slightly alkaline waste waters without the addition of acids to aid in breaking the emulsion. The invention will operate satisfactorily on waste waters ranging in pH up to about 9.5 but is has been found that better separation takes place if the effluent is reduced to a pH value of less than about 8 prior to contact with the transverse anolyte in the first anolyte stream zone.

Typical flocculating agents and coagulating aids may be added to the system. These agents are especially desirable when the pH of the waste water is above about 9. It has been found that one generally need not add flocculating agents if proteins or other high molecular charged particles are present in the waste water. If no proteins are present in the water, it is sometimes desirable to add a high molecular weight anionic polymer such as copolymers of from 90–50 weight percent acrylamide or methacrylamide and from 10–50 weight percent acrylic or methacrylic acid or water soluble salt thereof. The process is not limited to any particular type of additives and it is pointed out that cationic polymers, anionics and nonionic polymers function in various systems. The present system is believed to be an improvement over existing cathodic separation systems in that the two anolyte streams, being three-dimensional in configuration are much more efficient and minimize the cathode effects of the tank walls which tend to cause re-emulsification. The three-dimensional system favors the low pH environment and accordingly there is less need for a pH adjustment than with the planar system.

Since anode to cathode distances are reduced, lower anode potentials are sufficient to polarize the cathode, so that less current flow is required than with a planar system. This means the cationic particles will repel from the cathode at lower anode potentials. Because there are more closely associated anodes, the opportunity for anode particles to agglomerate and attach to the anodes is increased, giving a more efficient removal of anionic particles. Not only do the anionic and cationic particles move more efficiently in their respective zones, they are also more efficiently removed from the waste water. With the larger number of anodes, the distribution of the anionic particles among the anodes reduces the possibility of an anode becoming too heavily coated with particles, thereby becoming less effective or even inoperative.

The following example is set forth as an illustrated embodiment showing a two-dimensional anolyte stream.

EXAMPLE 1

A steel tank about 3 feet wide, 6 feet long and filled to a liquid level of 5 feet 6 inches was used as a test cell. The waste water consisted of packinghouse waste water having fat, proteins and some cellulose. The test unit had a baffle across the width of the tank about 26 inches from the inlet end. The baffle, perpendicular to the floor of the tank and parallel to the inlet end, was 28 inches high. It also contained an 8 inch upper section which was inclined at a 45° angle toward the discharge end. Two anodes were suspended in the waste water by means of insulated support members. Two anodes were placed in a transverse alignment and were in a vertical plane parallel to each other and also parallel to the wall of the inlet section as well as the baffle. Two anodes were installed parallel to each other and to side walls in a 45° diagonal position. The upper end of the anodes was approximately 6 inches from the discharge end. The lower end of the anodes was about 6 inches from the bottom of the baffle. The anodes were approximately 11 inches from side walls and were 5 feet in length. Two pairs of additional anodes parallel to each other, tank walls and surface were also installed approximately 11 inches from the side walls. The upper pair of anodes was 8 inches below liquid level. The lower pair cleared the baffles separating the inlet and discharge end. Discharged effluent entered the water box through a 2 inch wide opening across the width of the tank. Discharged effluent from the cell entered the water box which extended across the width of the flotation unit. Effluent discharge from this unit was of poor quality the first day. Some improvement was produced the third day. Current requirements were fairly high. Using a rectified DC current to energize the anodes, a rectifier setting was at 14 volts causing 48 amperes of current to flow. Current flow dropped slightly the second day and on the third day current flow was at 42 amperes. Calcial deposits on the tank walls were rather heavy after the third day. These deposits existed on the tank walls parallel to the anodes. Heavy deposits of sludge adhered to the underside of the inclined upper portion of the baffle. Floc settled in the effluent water discharge box. Considerable floc remained transit and was carried by a final effluent discharge.

The diagonal anodes were removed and replaced with pairs of parallel anodes parallel to the tank bottom and to the upper anodes along the longitudinal axis of the tank for use in the next example.

EXAMPLE II

Three pairs of parallel anodes were installed at three different levels in a tank of the same size as recited in Example I. The lower pair of anodes was spaced 14 inches from the floor. A second pair of transverse anodes was mounted 28 inches above the floor level and a third pair of transverse anodes was placed so as to be 3 inches below liquid level. Using a rectified DC current to energize the anodes, a setting of 10 volts was used. The anodes were positioned such that at any point between adjacent anodes, the lowest potential was between about 0.85 and about 3 volts. Waste water containing emulsions of fat and water was flowed through the system. Approximately 80 percent to 90 percent of the floc rose to the surface in the area directly above the space between the inlet end and the baffle. It was possible to see clearly most of the anodes in the discharge zone. Additional floc rose to the surface in the discharge zone and all floc was skimmed off.

Obviously, many modifications and variations of the invention as hereinbefore set forth may be made without departing from the spirit and scope thereof, and therefore, only such limitations should be imposed as are indicated in the appended claims.

I claim:

1. An apparatus for treating water-oil emulsion systems comprising a container having an entry conduit and an exit conduit and having a baffle across the width of the container and positioned nearer the inlet end than the discharge end thereby dividing said container into an inlet zone and a discharge zone, the lower section of said baffle being substantially parallel to the inlet end of the container and the upper section of said baffle being inclined toward the discharge end of said container, cylindrical anodes in the inlet zone spaced transverse to the longitudinal axis of the container, and cylindrical anodes in the discharge zone spaced parallel to the longitudinal axis of the container at about nearly equal distance apart in the discharge zone.

2. The apparatus claim 1 with at least one rod shaped anode in the discharge zone positioned near and substantially parallel to the baffle and being transverse to the longitudinal axis of the container.

3. The apparatus of claim 1 wherein the anodes are positioned such that the lowest potential at a point between any adjacent parallel anodes is greater than about 0.6 volts but not substantially in excess of about 3 volts.

4. The apparatus of claim 1 wherein the anodes are high silicon iron.

5. The apparatus of claim 1 wherein the anodes are parallel to the floor of the container.

* * * * *